US012423515B2

(12) United States Patent
Sheng

(10) Patent No.: US 12,423,515 B2
(45) Date of Patent: Sep. 23, 2025

(54) IMAGE PROCESSING DEVICE WITH INTELLIGENT TYPESETTING FUNCTION AND METHOD THEREOF

(71) Applicant: AVISION INC., Hsinchu (TW)

(72) Inventor: Shao-Lan Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 9 days.

(21) Appl. No.: 18/490,792

(22) Filed: Oct. 20, 2023

(65) Prior Publication Data

US 2024/0135091 A1 Apr. 25, 2024
US 2024/0232521 A9 Jul. 11, 2024

(30) Foreign Application Priority Data

Oct. 21, 2022 (TW) .................................. 111140095

(51) Int. Cl.
G06F 40/189 (2020.01)
G06T 11/60 (2006.01)
H04N 1/203 (2006.01)

(52) U.S. Cl.
CPC ............ *G06F 40/189* (2020.01); *G06T 11/60* (2013.01); *H04N 1/2032* (2013.01)

(58) Field of Classification Search
CPC ...... G06F 40/189; G06T 11/60; H04N 1/2032
See application file for complete search history.

(56) References Cited

U.S. PATENT DOCUMENTS

| 9,648,207 | B2 * | 5/2017 | Sheng | .................. H04N 1/3935 |
| 10,142,509 | B2 * | 11/2018 | Li | ........................ H04N 1/0464 |
| 2012/0188567 | A1 * | 7/2012 | Sheng | .................. H04N 1/0044 |
| | | | | 358/1.9 |
| 2020/0153994 | A1 * | 5/2020 | Packirisamy | ...... H04N 1/00474 |

FOREIGN PATENT DOCUMENTS

| CN | 101420497 A | * | 4/2009 |
| TW | 201233135 A | | 8/2012 |
| TW | 201532851 A | | 9/2015 |
| TW | 201725895 A | | 7/2017 |

* cited by examiner

*Primary Examiner* — Christopher E Mahoney
*Assistant Examiner* — Marissa Ferguson-Samreth

(57) ABSTRACT

An image processing device with intelligent typesetting function and method thereof is provided. A processor is connected to an image capture module, a memory module and an output module respectively. A first image is acquired by the image capture module and a set of scanning position information in the memory module. A set of typesetting parameters is applied to the corresponding scanning position information. The processor continues to obtain a second side image through the image capture module and applies the set of typesetting parameters. The processor generates a typesetting image based on the set of typesetting parameters, the first side image and the second side image, and causes the output module to output the typesetting image. Through intuitive scanning procedures and intelligent and quick application of preset image typesetting methods, tedious operations are reduced, thereby improving efficiency and convenience.

16 Claims, 6 Drawing Sheets

IMAGE PROCESSING DEVICE WITH INTELLIGENT TYPESETTING FUNCTION AND METHOD THEREOF

CROSS-REFERENCE TO RELATED APPLICATION

This application claims the priority benefit of Taiwanese Patent Application Serial Number 111140095, filed on Oct. 21 2022, the full disclosure of which is incorporated herein by reference.

BACKGROUND

Technical Field

The present disclosure relates to an image processing device and method, and in particular, to an image processing device and method with an intelligent typesetting function that can perform image typesetting according to the position of the image scan.

Related Art

As the work environment changes, the amount of information that needs to be processed every day is increasing. In order to facilitate the handling of related business processing, preparation of meeting materials, etc., a business machine is prepared in the corresponding work area to facilitate copying relevant materials.

A conventional business machine includes a cover, a scanner, an operation panel, and an output device. The cover is disposed on the scanner, and the operation panel is disposed outside the scanner. When the user wants to make a two-sided copy of a piece of media data (such as an identity document), he first opens the cover, place the side of the media data facing toward the scanner, and then closes the cover to cover the other side of the media. Subsequently, the user uses the operation panel to operate to select the typesetting of the media data in an output file. Then, the user turns over the media data so that the other side of the media data faces the scanner. Then the user operates a copy key on the operation panel, and the business machine outputs in the output file according to the typesetting of the output file selected by the user.

However, with the existing double-sided copying method, as the functions of business machines become increasingly complex, users need to spend a lot of time studying and understanding the operating functions of the operation panel. When copying both sides, the user must first use this operation panel to select the image output method. After the media data is turned over, the copy key needs to be further pressed to output the output file. As a result, the user not only needs to spend a lot of time to become familiar with the functions of the operation panel, but also needs to repeatedly operate the operation panel during the operation, which greatly affects the overall copying efficiency and is inconvenient.

SUMMARY

In view of the deficiencies in the prior art above, the disclosure provides an image processing device with intelligent typesetting function and method thereof. Through intuitive scanning procedures and intelligent and quick application of preset image typesetting methods, tedious operations are reduced, thereby improving efficiency and convenience.

In one embodiment, an image processing device with intelligent typesetting function, comprising: an image capture module for obtaining an image of double-sided media data; a memory module having a set of scanning position information and preset with a set of corresponding typesetting parameters; a processor connected to the image capture module and the memory module respectively; and an output module connected to the processor; wherein the image capture module first obtains a first side image of the double-sided media data; when the processor determines that the first side image matches the set of the scanning position information, the set of the typesetting parameters is applied to the first side image; the processor continuously obtains a second side image of the double-sided media data through the image capture module, and applies the set of the typesetting parameters to the second side image; the processor forms a first typesetting image according to the set of typesetting parameters, the first side image and the second side image, and outputs the first typesetting image through the output module.

According to the above embodiment, the set of scanning position information and the set of typesetting parameters are stored in the memory module of the aforementioned image processing device. After obtaining the first side image and the second side image, the preset image typesetting method can be quickly and intelligently applied in an intuitive manner based only on the image and scanning position, thereby reducing cumbersome operations and achieving the purpose of improving efficiency and convenience of use.

In one embodiment, an image processing method with intelligent typesetting function, scanning an image of a double-sided media data on an image processing device comprising: providing a set of scanning position information and preset with a set of corresponding typesetting parameters; obtaining a first side image of the double-sided media data and determining whether the first side image matches the set of the scanning position information or not; when the first side image matches the set of the scanning position information, applying the set of the typesetting parameters to the first side image; obtaining a second side image of the double-sided media data, and applying the set of the typesetting parameters to the second side image; and forming a first typesetting image according to the set of typesetting parameters, the first side image and the second side image, and outputs the first typesetting image through the output module.

According to the above embodiment, the aforementioned method determines that the obtained first side image matches the set of scanning position information, then applies the set of typesetting parameters to the first side image, and to the second side image received subsequently. In this intuitive way, the preset image typesetting method can be intelligently and quickly applied based only on the image and scanning position, thereby reducing tedious operations and achieving the purpose of improving efficiency and convenience.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
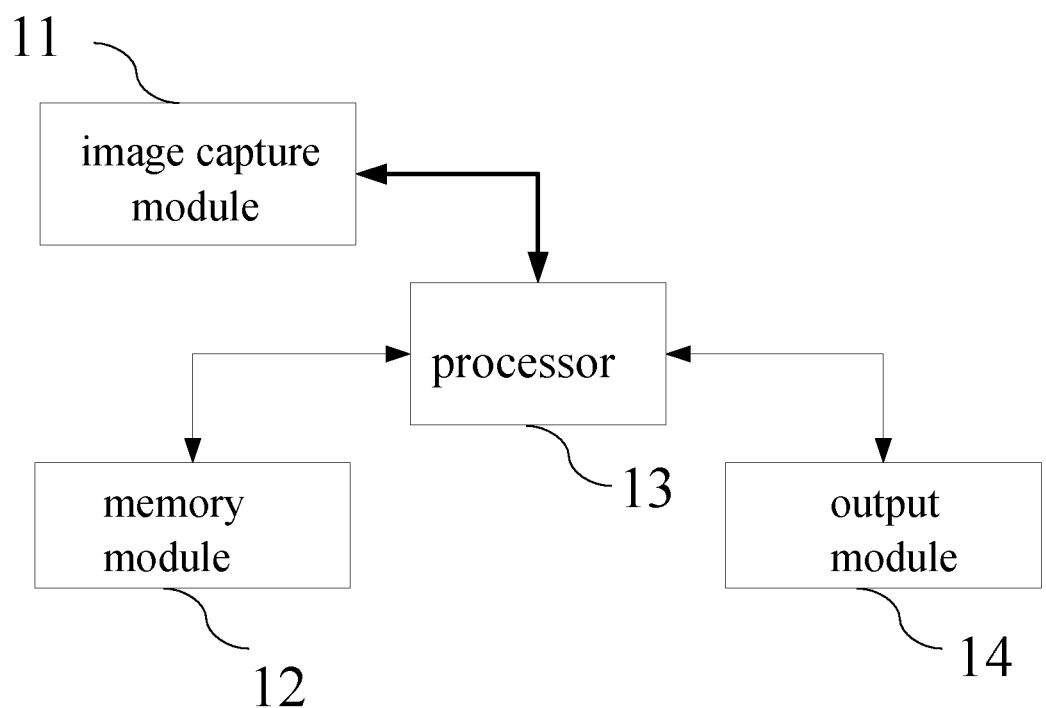
FIG. 1 is an architectural block diagram of an image processing device with intelligent typesetting function according to one embodiment of the present disclosure.
Figure 2:
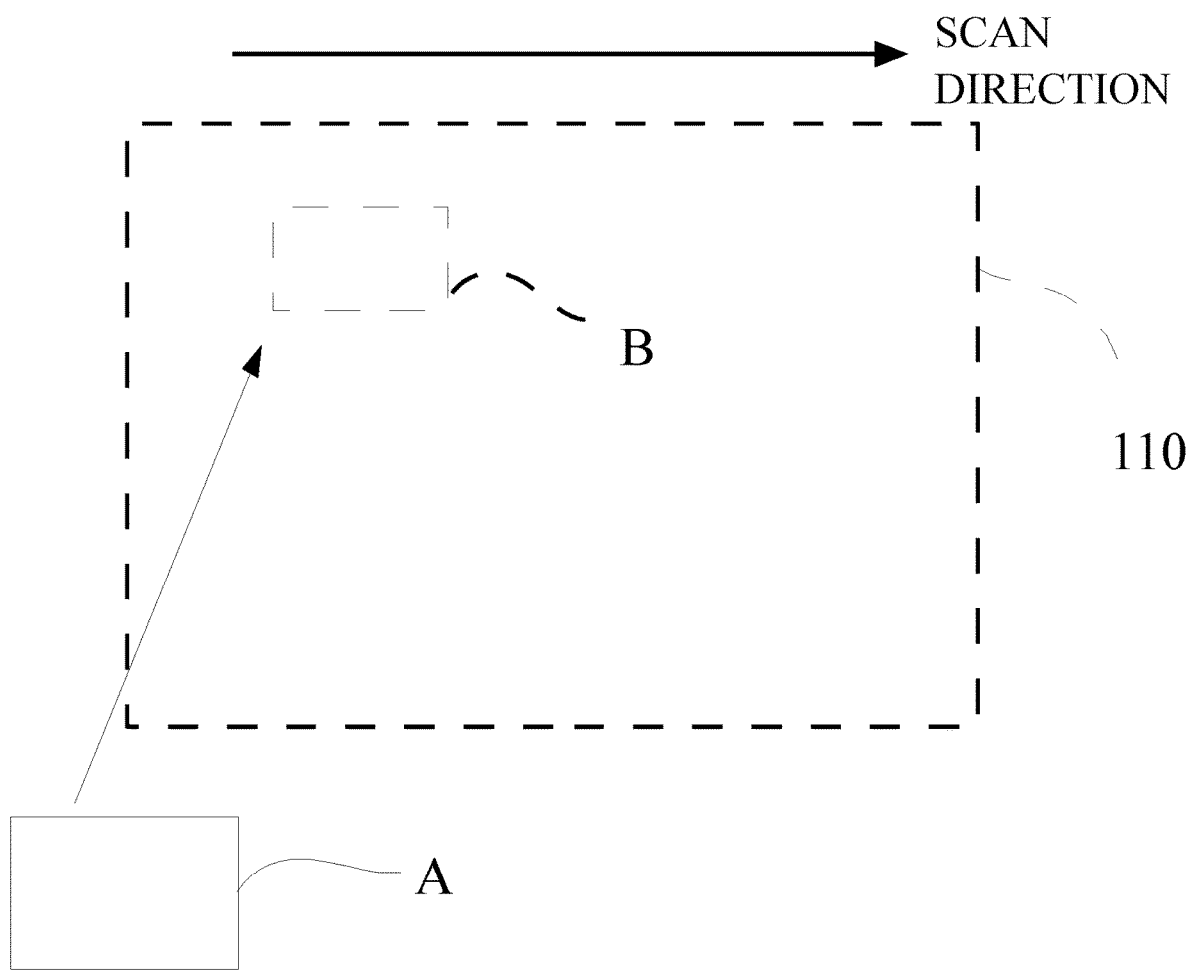
FIG. 2 is a schematic diagram of printing method of an image processing device with intelligent typesetting function according to one embodiment of the present disclosure.

Regarding the preferred embodiment of the image processing device with intelligent typesetting function of the present invention, please refer to FIGS. 1 and 2. The image processing device includes an image capture module 11, a memory module 12, a processor 13 and an output module 14. The processor 13 is connected to the image capture module 11, the memory module 12 and the output module 14 respectively. In this embodiment, the image processing device with intelligent typesetting function of the present invention can be a platform type business machine 100. The user can hold the double-sided media data A and perform intelligent typesetting and copying on the image processing device with intelligent typesetting function of the present invention. The platform type business machine 100 further has a cover (not shown in the figure) and a glass area 110. When in use, the user lifts the cover and place the document to be scanned on the glass area 110. The image capture module 11 is disposed below the glass area 110. Then the cover is closed, and the image capture module 11 scans the document from left to right to obtain the image of the double-sided media data A. In this embodiment, the image capture module 11 may be composed of a scanner, including a CCD scanner or a CIS scanner.

The image capture module 11 can be used to obtain a front image or a back image of the double-sided media data A. The memory module 12 has a set of scanning position information, and is preset with a set of corresponding typesetting parameters. In this embodiment, the set of scanning position information can be pre-stored in the memory module 12, or the set of scanning position information can be updated according to the user's needs. The set of scanning position information corresponds to the set of typesetting parameters. The processor 13 is configured to process the received image and perform corresponding image processing, and finally the output module 14 outputs a paper document. In this embodiment, the processor 13 can be a CPU, an MCU or a GPU, and the memory module 12 can be a memory, a memory card or a hard disk; in this embodiment, the output module 14 may be a printer.

In this embodiment, the set of scanning position information includes a first scanning coordinate information or a first scanning range area information, and corresponds to a first typesetting parameter. The first scanning coordinate information or the first scanning range area information corresponds to a scanning position B set in the range that the image capture module 11 can scan. The scanning position B can be a coordinate point or an area (such as the range size of 10 cm*10 cm, etc.). If the scanning position B is the coordinate point, it corresponds to the first scanning coordinate information; if the scanning position B is the range area, it corresponds to the first scanning range area information. In this embodiment, the range area can be set according to the user's needs. Therefore, the range area is not limited to 10 cm*10 cm, but can also be 20 cm*20 cm, etc. In this embodiment, the range size is only an example and not a limitation. Therefore, in this embodiment, the set of scanning position information can be set according to needs, and the settings of different scanning position information can respectively correspond to different sets of typesetting parameters.

Referring to FIGS. 1 and 2, the user places a first side of the double-sided media material A on the glass area 110 above the image capture module 11, and lowers the cover. Then the image capture module 11 scans the double-sided media data A in a scanning direction (from left to right as shown in the figure) to obtain a first-side image A1 (see FIGS. 2 and 3). Subsequently, the processor 13 receives the first side image A1 of the double-sided media data A obtained by the image capture module 11, and determines whether it matches the set of scanning position information. When the processor 13 determines that the first side image A1 matches the first scanning position information, the processor 13 applies the set of typesetting parameters to the first side image A1. In this embodiment, the double-sided media data A may be an identity card, a health insurance card, a driver's license, a passport, or other related identity documents, or may be a file of A4, B4, etc. size.

As shown in FIGS. 1 and 2, an example is given to illustrate the method in which the processor 13 determines whether the first side image A1 matches the set of scanning position information. In this embodiment, the processor 13 determines whether the first side image coordinate information of the first side image A1 overlaps with the first scanning coordinate information. When the first side image coordinate information of the first side image A1 overlaps with the first scanning coordinate information, the first side image A1 is determined to be matched with the set of scanning position information. That is to say, when the position where the double-sided media data A is placed overlaps with the scanning position B, the first side image coordinate information of the first side image A1 overlaps with the first scanning coordinate information. Further, the processor 13 applies the first typesetting parameter of the set of typesetting parameters to the first side image A1. When the processor 13 determines that the first side image coordinate information of the first side image A1 does not overlap with the first scanning coordinate information, the processor 13 applies the second typesetting parameter different from the first typesetting parameter to the first side image A1.

In addition, another example is provided to illustrate another method for the processor 13 to determine whether the first side image A1 matches the set of scanning position information. As shown in FIGS. 1 and 2, in this embodiment, the processor 13 determines whether the first scanning coordinate information overlaps (contacts) with the first scanning range area information. If so, it is determined that the first side image A1 matches the set of scanning position information, that is, the position where the double-sided media data A is placed completely overlaps or partially overlaps the scanning position B. Further, the processor 13 applies the first typesetting parameter of the set of typesetting parameters to the first side image A1. If the processor 13 determines that the first side image coordinate information does not overlap with the first scanning coordinate information, the processor 13 applies the second typesetting parameter different from the first typesetting parameter to the first side image A1.

Then, when the user turns over the double-sided media data A on the glass area 110, so that a second side of the double-sided media data A faces the image capture module 11 below the glass area 110, and puts the cover down. Then, the image capture module 11 also scans the double-sided media data A, and then obtains a second side image A2 of the double-sided media data A (as shown in FIGS. 2 and 3). When the processor 13 obtains the second side image A2, the processor 13 directly applies the same set of typesetting parameters to the second side image A2 same as the first side image A1.

It should be emphasized that when the user places the second side, the position placed is not limited to the set of scanning position information, thereby allowing the user to place the second side of the double-sided media data A. Therefore, the operation is more free, flexible and convenient.

Further, referring to FIGS. 1 to 3A, the processor 13 forms a first typesetting image C based on the set of typesetting parameters, the first side image A1 and the second side image A2 aforementioned. The processor 13 executes a printing program to output the first typesetting image C through the output module 14. The processor 13 applies the first typesetting parameter of the set of typesetting parameters to the second side image A2.

To further illustrate the specific application method of the processor 13 applying typesetting parameters to images in this embodiment, please refer to FIGS. 1 to 3A. The first typesetting image C has an image typesetting area D for the processor 13 to correspondingly set the first side image A1 and the second side image A2 in the image typesetting area D according to the set of typesetting parameters.

Figure 3A:
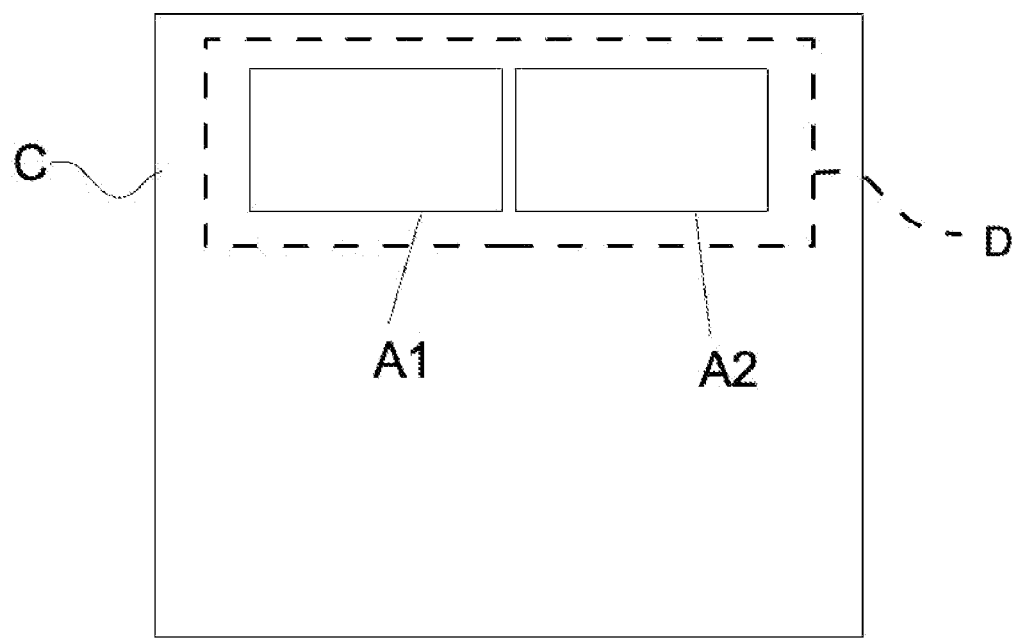
FIG. 3A is a schematic diagram of a typesetting image of an image processing device with intelligent typesetting function according to an embodiment of the present disclosure.

Further, please refer to FIG. 3A. In this embodiment, when the position of the image typesetting area D is preset above the first typesetting image C, The set of typesetting parameters may include an upper typesetting parameter. The processor 13 correspondingly sets the first side image A1 and the second side image A2 in the image typesetting area D above the first typesetting image C according to the upper typesetting parameters, thereby forming the aforementioned first typesetting image C and executing a printing process so that the output module 14 prints and outputs the first typesetting image C having the first side image A1 and the second side image A2.

In one embodiment, the set of typesetting parameters may further include a right typesetting parameter. The image typesetting area D can also be pre-set to the right of the first typesetting image C, so that the first side image A1 and the second side image A2 are arranged on the right side of the first typesetting image C. Therefore, more flexible typesetting may be provided for the first typesetting image C.

Figure 3B:
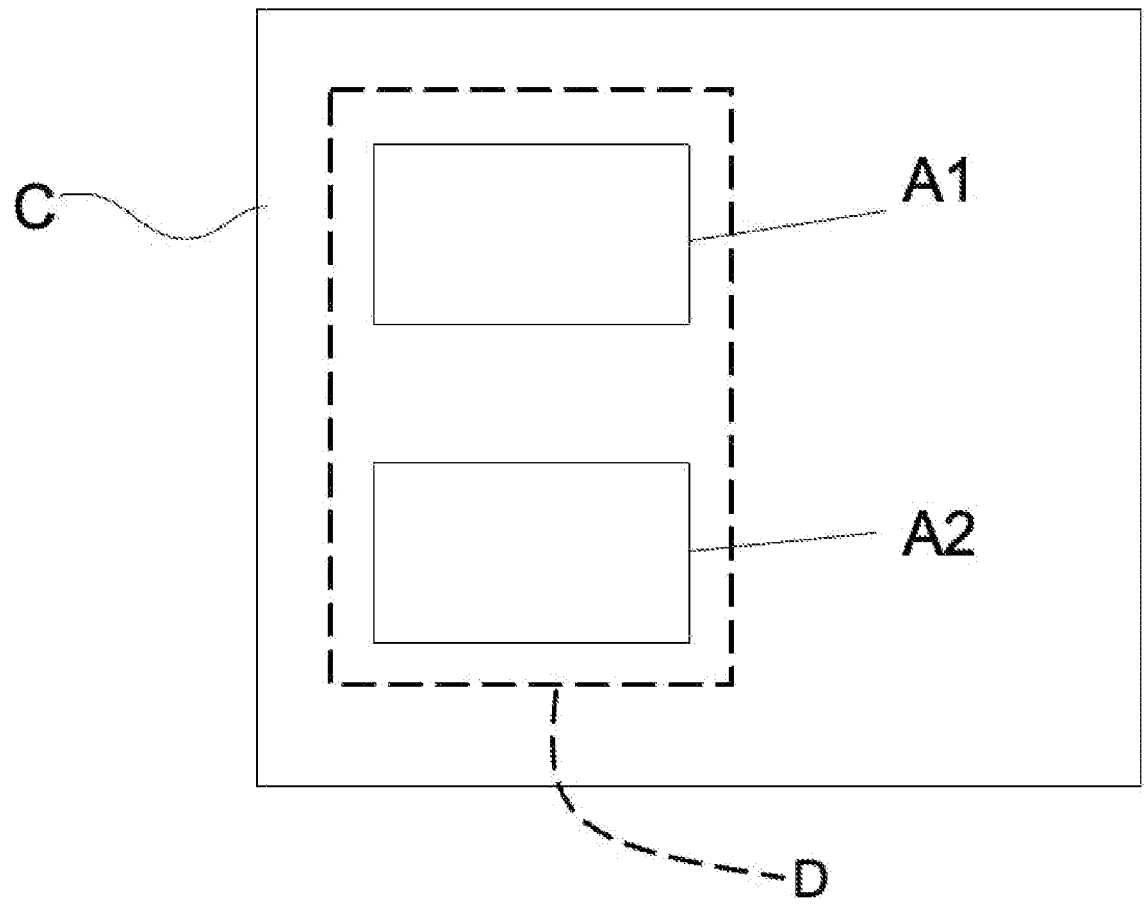
FIG. 3B is a schematic diagram of a typesetting image of an image processing device with intelligent typesetting function according to an embodiment of the present disclosure.

In another embodiment, referring to FIG. 3B, the set of typesetting parameters may also include a left typesetting parameter. That is, the first side image A1 and the second side image A2 are set to the left of the first typesetting image C, so that the typesetting position provided by the first typesetting image C is not affected and limited by the left and right format of the corresponding output paper.

In yet another embodiment, the set of typesetting parameters includes a lower typesetting parameter. The image typesetting area D can also be pre-set below the first typesetting image C, that is, the first side image A1 and the second side image A2 are set below the first typesetting image C, so that the typesetting position provided by the first typesetting image C is not affected and limited by the left and right format of the corresponding output paper.

In other embodiments, the set of the typesetting parameters includes a center typesetting parameter. The image typesetting area D can also be pre-set in the middle of the first typesetting image C, that is, the first side image A1 and the second side image A2 are set in the middle of the first typesetting image C. Therefore the first typesetting image C can provide more diverse typesetting positions, not limited to top, bottom, left or right.

In one embodiment, the first side image A1 and the second side image A2 can respectively present a top-down arrangement or a left-right arrangement under different typesetting parameters, thereby allowing the first typesetting image C to provide more flexible and changeable typesetting position.

Furthermore, for the convenience of the user to scan one or more double-sided media data A on the glass area 110 of the platform-type business machine 100, the set of the scanning position information may also include a second scanning coordinate information different from the first scanning coordinate information, or a second scanning range area information different from the first scanning range area information, both corresponding to the second typesetting parameter of the typesetting parameters that is different from the first typesetting parameter. That is to say, the second scanning coordinate information or the second scanning range area information corresponds to another scanning position B' in the range that the image capture module 11 can scan. Specifically, the image capture module 11 can scan two different scanning positions B and B', so that the user can scan two double-sided media data A at the same time, thereby providing different scanning capabilities to correspond to different double-sided media data A to improve the convenience of use.

When the user places two double-sided media data A at the same time and obtains the corresponding first-side image A1, the first typesetting parameter and the second typesetting parameter can be applied respectively according to the scanning positions B and B' of different positions. That is to say, the first scanning coordinate information or the second scanning range area information has its own corresponding typesetting parameters, and the second scanning coordinate information or the second scanning range area information has its own corresponding typesetting parameters. Through different typesetting parameters, different typesetting effects are produced to increase the variability of typesetting.

In addition, in another embodiment, when the processor 13 determines that the first side image A1 does not match the set of scanning position information, the processor 13 obtains the second side image A2 of the double-sided media data A through the image capture module 11, and a second typesetting image is generated based on the first side image A1 and the second side image A2, and the output module 14 prints and outputs the second typesetting image.

For example, as shown in FIGS. 2 and 3, after obtaining the first side image A1 and the second side image A2 of two double-sided media data A, a typesetting image can be formed according to their respective typesetting parameters. For example, the first side image A1 and the second side image A2 of the first double-sided media material A can correspond to the upper typesetting parameters, while the first side image A1 and second side image A2 of the second double-sided media material A can correspond to the lower typesetting parameters. The corresponding typesetting parameters mentioned above can be set according to needs. Further, the first side image A1 and the second side image A2 of the first double-sided media material A can be in the top-bottom arrangement, and the first side image A1 and second side image A2 of the second double-sided media material A can be in the left and right arrangement, thereby making the typesetting position provided by the typesetting image C more flexible. It must be noted that the foregoing description of the application status in this embodiment is only an example and not a limitation. In one embodiment, corresponding typesetting images C can be constructed based on two double-sided media data A. In another embodiment, a single typesetting image C can also be constructed based on two double-sided media data A. Since different typesetting images C can be generated according to user requirements, the convenience and flexibility of use are improved.

Therefore, in this embodiment, different scanning positions B and corresponding typesetting parameters can be further set according to the size and range of the typesetting image, or the number of double-sided media data A that need to be scanned, thereby improving the flexibility of use and convenience.

Figure 4:
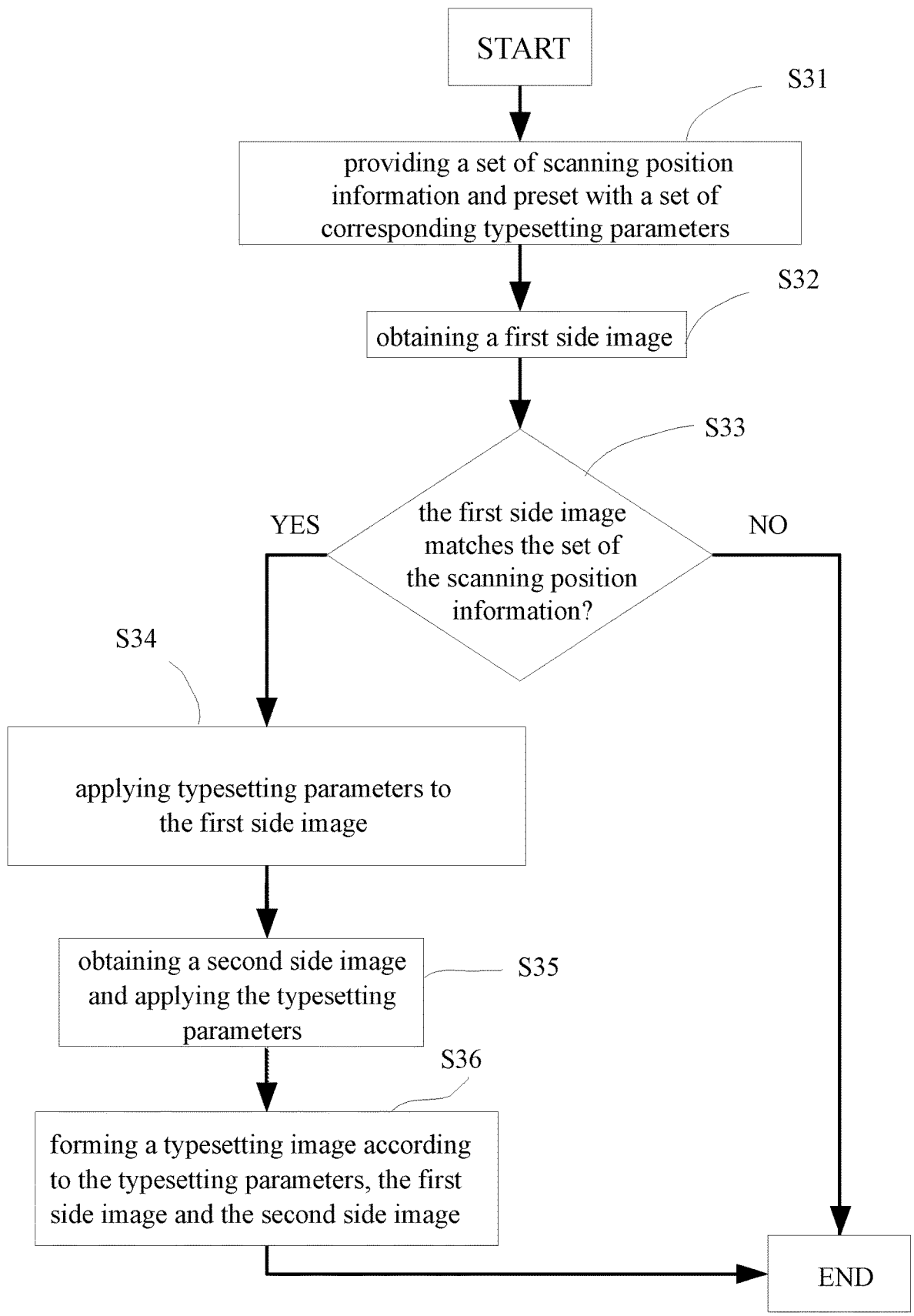
FIG. 4 is a flow chart of an image processing method with intelligent typesetting function according to one embodiment of the present disclosure.

Referring to FIG. 4, according to the disclosure of the above embodiment, an image processing method with intelligent typesetting function can be further summarized, and the image of the double-sided media data A is scanned on the aforementioned image processing device with intelligent typesetting function. The processor 13 of the image processing device performs the following steps:

providing a set of scanning position information and preset with a set of corresponding typesetting parameters (S31);

obtaining a first side image of the double-sided media data A (S32) and determining whether the first side image matches the set of the scanning position information or not (S33);

when the first side image matches the set of the scanning position information, applying the set of the typesetting parameters to the first side image (S34);

obtaining a second side image of the double-sided media data A, and applying the set of the typesetting parameters to the second side image (S35); and forming a first typesetting image according to the set of typesetting parameters, the first side image and the second side image (S36).

Figure 5:
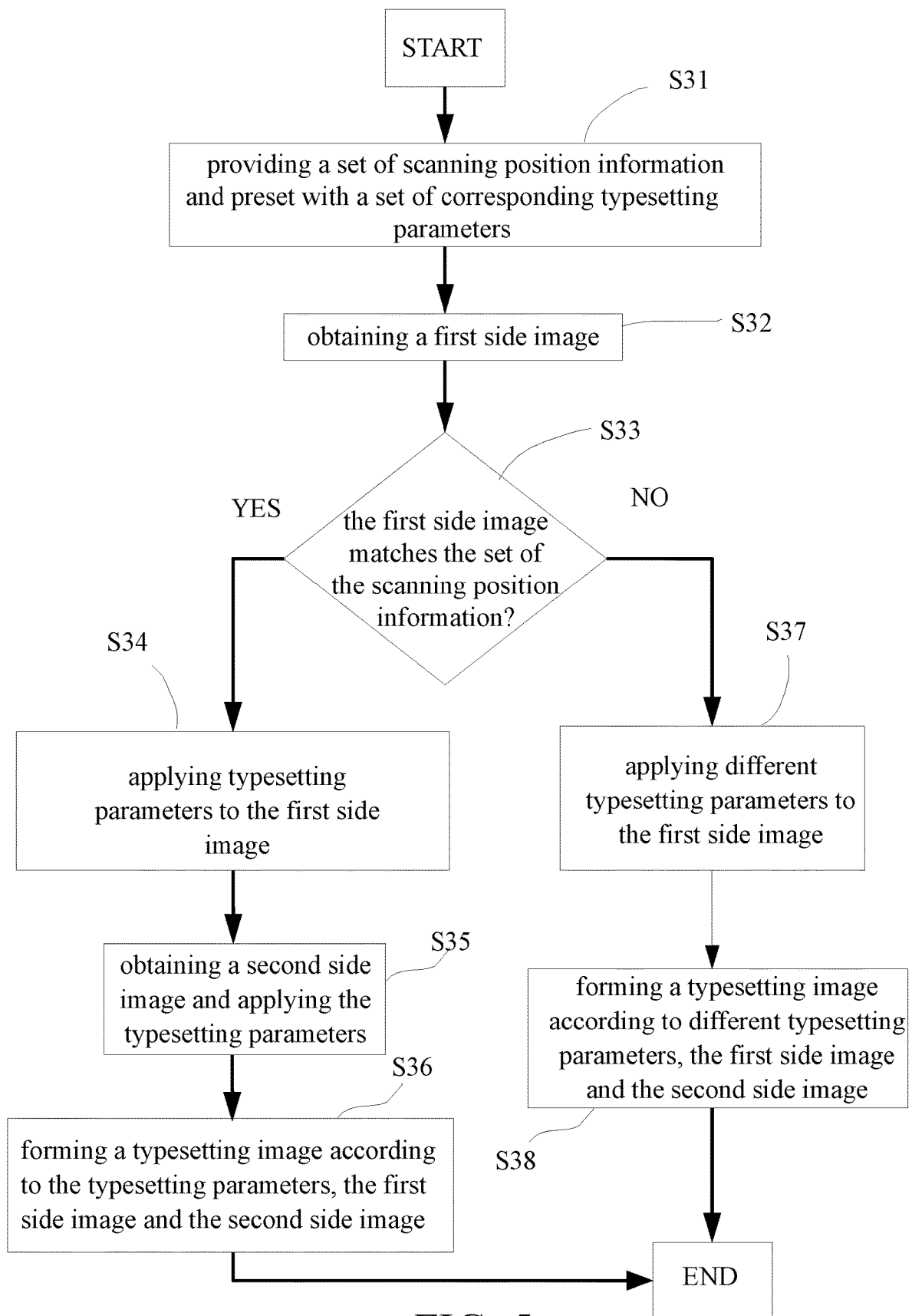
FIG. 5 is a flow chart of an image processing method with intelligent typesetting function according to one embodiment of the present disclosure.

In another embodiment, the set of typesetting parameters comprises a first typesetting parameter and a second typesetting parameter. The first typesetting parameter is configured to apply the first typesetting parameter to the first side image when the first side image matches the set of the scan position information and the step of when the first side image matches the set of the scanning position information, applying the set of the typesetting parameters to the first side image (S34) is performed such that the first typesetting image is formed according to the first typesetting parameter, the first side image and the second side image. In this embodiment, the first typesetting parameter is different from the second typesetting parameter. When the method performs the step of determining whether the first side image matches the set of the scanning position information or not (S33), as shown in FIG. 5, the method further comprise the steps of:

applying the second typesetting parameter to the first side image when the first side image does not match the set of the scanning position information (S37); and forming a first typesetting image according to the second typesetting parameter different from the first typesetting parameter, the first side image and the second side image (S38).

In one embodiment, after the first typesetting image is formed, a printing process is further executed, or after the second typesetting image is formed, the printing process is further executed.

In this embodiment, the set of scanning position information includes first scanning coordinate information or first scanning range area information. In another embodiment, the set of scanning position information further includes a second scanning position information or a second scanning range area information. The first scanning range area information and the second scanning range area information are completely non-overlapping, thereby increasing the flexibility and changeability of use.

In this embodiment, the first typesetting parameter of the set of typesetting parameters may include an upper typesetting parameter, a right typesetting parameter, a left typesetting parameter, a lower typesetting parameter or a center typesetting parameter. Further, the first typesetting parameter of the set of typesetting parameters may respectively include a top-bottom typesetting arraignment or a left-right typesetting arrangement.

According to the above disclosure, it can be known that the scanning position is obtained intuitively by scanning the position of the double-sided media data A, and the preset image typesetting method is quickly and intelligently applied according to the scanned position of the double-sided media data A. Tedious operations are reduced, thereby improving efficiency and convenience.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An image processing device with intelligent typesetting function, comprising:
   an image capture module for obtaining an image of double-sided media data;
   a memory module having a set of scanning position information and preset with a set of corresponding typesetting parameters;
   a processor connected to the image capture module and the memory module respectively; and
   an output module connected to the processor;
   wherein the image capture module first obtains a first side image of the double-sided media data; when the processor determines that the first side image matches the set of the scanning position information, the set of the typesetting parameters is applied to the first side image;
   the processor continuously obtains a second side image of the double-sided media data through the image capture module, and applies the set of the typesetting parameters to the second side image;
   the processor forms a first typesetting image according to the set of typesetting parameters, the first side image and the second side image, and outputs the first typesetting image through the output module;
   wherein the set of scanning position information comprises a first scanning range area information corresponding to a first typesetting parameter; when a first side image coordinate information of the first side image overlaps with the first scanning range area information, the first side image is determined to be matched with the set of scanning position information, and the processor applies the first typesetting parameter to the firs side image and the second side image.

2. The device according to claim 1, wherein the set of scanning position information comprises a first scanning coordinate information corresponding to a first typesetting parameter; when a first side image coordinate information of the first side image overlaps with the first scanning coordinate information, the first side image is determined to be matched with the set of scanning position information, and the processor applies the first typesetting parameter to the firs side image and the second side image.

3. The device according to claim 2, wherein the first typesetting parameter comprises an upper typesetting parameter, a right typesetting parameter, a left typesetting parameter, a bottom typesetting parameter or a center typesetting parameter.

4. The device according to claim 1, wherein the set of scanning position information comprises a second typesetting parameter; when a first side image coordinate information of the first side image does not overlaps with the first scanning coordinate information, the first side image is determined to be not matched with the set of scanning position information, and the processor applies the second typesetting parameter to the firs side image and the second side image.

5. The device according to claim 4, wherein the second typesetting parameter comprises an upper typesetting parameter, a right typesetting parameter, a left typesetting parameter, a bottom typesetting parameter or a center typesetting parameter.

6. The device according to claim 1, wherein the first typesetting parameter comprises an upper typesetting parameter, a right typesetting parameter, a left typesetting parameter, a bottom typesetting parameter or a center typesetting parameter.

7. The device according to claim 1, wherein the set of scanning position information comprises a second scanning range area information corresponding to a first typesetting parameter; when a first side image coordinate information of the first side image does not overlap with the first scanning range area information, the first side image is determined to be matched with the set of scanning position information, and the processor applies the second typesetting parameter to the firs side image and the second side image.

8. The device according to claim 7, wherein the second typesetting parameter comprises an upper typesetting parameter, a right typesetting parameter, a left typesetting parameter, a bottom typesetting parameter or a center typesetting parameter.

9. An image processing method with intelligent typesetting function, scanning an image of a double-sided media data on an image processing device comprising:
   providing a set of scanning position information and preset with a set of corresponding typesetting parameters;
   obtaining a first side image of the double-sided media data and determining whether the first side image matches the set of the scanning position information or not;
   when the first side image matches the set of the scanning position information, applying the set of the typesetting parameters to the first side image;
   obtaining a second side image of the double-sided media data, and applying the set of the typesetting parameters to the second side image; and
   forming a first typesetting image according to the set of typesetting parameters, the first side image and the second side image, and outputs the first typesetting image through the output module;

wherein the set of scanning position information comprises a first scanning coordinate information corresponding to a first typesetting parameter; when a first side image coordinate information of the first side image overlaps with the first scanning coordinate information, the first side image is determined to be matched with the set of scanning position information, and the processor applies the first typesetting parameter to the firs side image and the second side image.

10. The method according to claim 9, further comprising performing a printing process according to the first typesetting image or the second typesetting image.

11. The method according to claim 9, wherein the set of typesetting parameters comprises a first typesetting parameter; when the method performing the step of obtaining a first side image of the double-sided media data and determining whether the first side image matches the set of the scanning position information or not, the method further comprises steps of: applying the first typesetting parameter to the first side image when the first side image matches the set of the scanning position information; and forming a first typesetting image according to the first typesetting parameter, the first side image and the second side image.

12. The method according to claim 11, further comprising performing a printing process according to the first typesetting image or the second typesetting image.

13. The method according to claim 9, wherein the set of typesetting parameters comprises a first typesetting parameter and a second typesetting parameter different from the first typesetting parameter; when the method performing the step of obtaining a first side image of the double-sided media data and determining whether the first side image matches the set of the scanning position information or not, the method further comprises steps of: applying the second typesetting parameter to the first side image when the first side image does not match the set of the scanning position information; and forming a first typesetting image according to the second typesetting parameter, the first side image and the second side image.

14. The method according to claim 9, wherein the set of scanning position information comprises a second typesetting parameter different from the first typesetting parameter; when the first side image is obtained and is determined not to match the first scan coordinate information, applying the second typesetting parameter to the first side image and the second side image received subsequently.

15. The method according to claim 9, wherein the set of scanning position information comprises a first scanning range area information corresponding to a first typesetting parameter; when a first side image coordinate information of the first side image overlaps with the first scanning range area information, the first side image is determined to be matched with the set of scanning position information, and applying the first typesetting parameter to the firs side image and the second side image.

16. The method according to claim 15, wherein the set of scanning position information comprises a second typesetting parameter different from the first typesetting parameter; when the first side image is obtained and is determined not to match the first scanning range area information, applying the second typesetting parameter to the first side image and the second side image received subsequently.

\* \* \* \* \*